United States Patent [19]

Mimbs

[11] Patent Number: 4,793,879

[45] Date of Patent: Dec. 27, 1988

[54] METHOD FOR PERFORMING A REPAIR ON AN OBSTRUCTED SECTION OF A COMPOSITE STRUCTURE

[75] Inventor: Charles C. Mimbs, Gordon, Ga.

[73] Assignee: Grumman Aerospace Corporation, Bethpage, N.Y.

[21] Appl. No.: 131,199

[22] Filed: Dec. 10, 1987

[51] Int. Cl.⁴ .............................................. B32B 35/00
[52] U.S. Cl. .................................... 156/98; 29/402.11; 156/94; 156/285; 264/36; 428/63; 428/911
[58] Field of Search .................. 29/402.09, 402.11; 156/94, 98, 285; 264/36; 428/63, 911

[56] References Cited

U.S. PATENT DOCUMENTS

| | | | |
|---|---|---|---|
| 4,287,015 | 9/1981 | Danner | 156/285 X |
| 4,352,707 | 10/1982 | Wengler et al. | 156/94 X |
| 4,486,254 | 12/1984 | Zinimon | 156/94 |
| 4,517,038 | 5/1985 | Miller | 156/98 |
| 4,554,036 | 11/1985 | Newsom | 156/94 |

Primary Examiner—Robert A. Dawson
Attorney, Agent, or Firm—Richard G. Geib; Daniel Jay Tick; Bernard S. Hoffman

[57] ABSTRACT

A method for performing a repair to a damaged area of a composite structure wherein an obstruction is in close proximity to the repair site, including the steps of laying up a first patch on the repair site on a first side of the composite structure, applying heat to the repair site via a second side of the composite structure which is opposite to the first side of the composite structure so that heat is conducted through the composite structure from the second side of the composite structure to the repair site on the first side of the composite structure, applying pressure to the repair site, and curing the first patch.

10 Claims, 1 Drawing Sheet

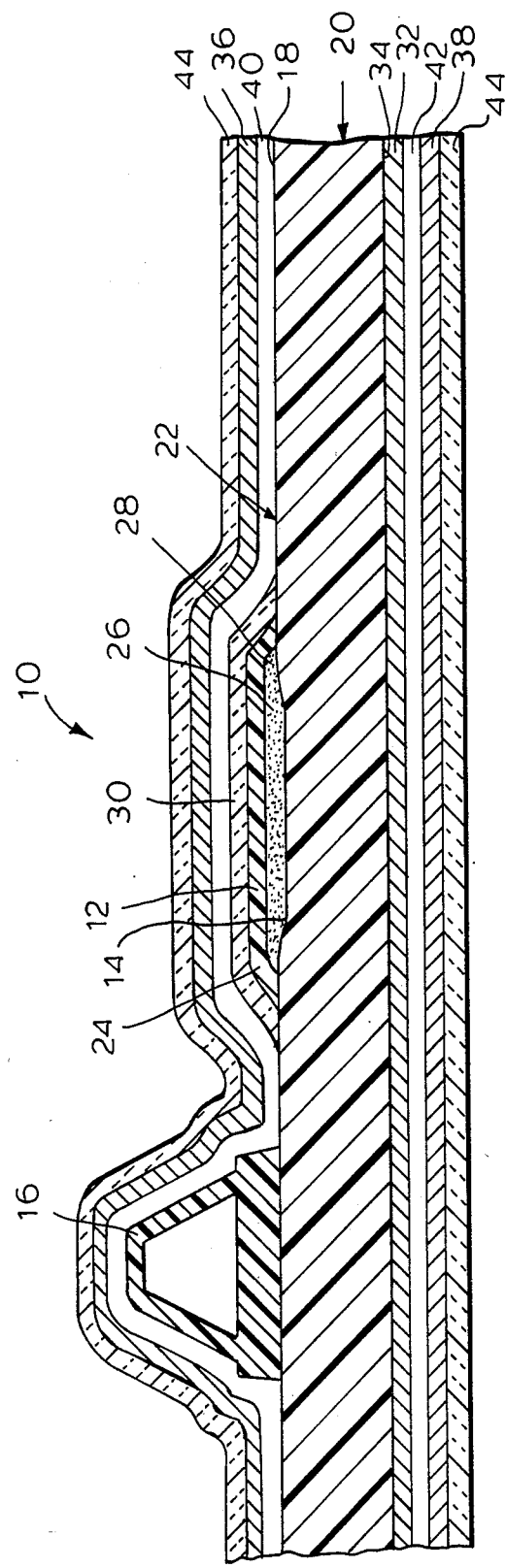

METHOD FOR PERFORMING A REPAIR ON AN OBSTRUCTED SECTION OF A COMPOSITE STRUCTURE

BACKGROUND OF THE INVENTION

The present invention relates to a method for performing a repair on an obstructed section of a composite structure. More particularly, the present invention relates to a method for performing a repair on an obstructed section of a composite structure, where the heating blanket is placed on the side of the composite structure opposite to the side containing the damaged area and thus allowing the repair patch to be cured with the heat conducted through the composite structure.

When curing a repair patch on an obstructed section of a composite structure, a heating blanket cannot be completely or sufficiently positioned over the repair patch because of the obstruction. This obstruction prevents complete intimate contact between the heating blanket and the repair patch to be cured. Consequently, an insufficient thermal coupling exists between the heating blanket and the repair patch to be cured. Furthermore, little or no pressure (from the local vacuum bag) is transmitted to the repair patch to be cured. Thus, a good repair would not be accomplished.

SUMMARY OF THE INVENTION

Accordingly, it is an object of the present invention to provide a method for performing a repair on an obstructed section of a composite structure which avoids the disadvantges of the prior art.

More particularly, it is an object of the present invention to provide a method for performing a repair on an obstructed section of a composite structure, which allows sufficient thermal coupling and sufficient pressure to exist between the heating blanket and the repair patch to be cured when it is impractical to place the heating blanket directly over the repair patch.

In keeping with these objects, and with others wiich will become apparent hereinafter, one feature of the present invention resides, briefly stated, in a method for performing a repair to a damaged area of a composite structure wherein an obstruction is in close proximity to the repair site, which includes the steps of laying up a first patch on the repair site on a first side of the composite structure, applying pressure to the repair site via the first side and a second side of the composite structure, add curing the first patch wherein heat is applied to the repair site via the second side of the composite structure which is opposite the first side of the composite structure.

When the method for performing a repair on an obstructed section of a composite structure is designed in accordance with the present invention, heat is conducted through the composite structure from the second side to the repair site on the first side.

In accordance with another feature of the present invention, it further includes the steps of supporting the composite structure outboard of the damaged area and the obstruction which is in close proximity to the damaged area prior to the step of laying up a first patch on the repair site on the first side of the composite structure, removing the damaged area from the composite structure and leaving a repair site on a first side of the composite structure subsequent to the step of supporting the composite structure outboard of the damaged area and the obstruction which is in close proximity to the damaged area, placing a second patch over the first patch subsequent to the step of laying up a first patch on the repair site on the first side of the composite structure, and applying insulation to the area surrounding the repair site so as to reduce heat loss subsequent to the step of placing a second patch over the first patch.

Another feature of the present invention is that it further includes the steps of removing the pressure from the first side and the second side of the composite structure, removing the heat from the second side of the composite structure, removing the insulation from the area surrounding the repair site, and removing the second patch from the first patch.

Yet another feature of the present invention is that the step of laying up a first patch over the repair site includes laying up a repair patch over the repair site.

Still another feature of the present invention is that the step of placing a second patch over the first patch includes placing a release film over the first patch.

Yet still another feature of the present invention is that the step of placing a release film over the first patch includes placing a FEP film over the first patch.

Still yet another feature of the present invention is that the step of applying heat to the repair site via the second side of the composite structure includes applying heat to the repair site using a heating blanket applied to the second side of the composite structure.

Another feature of the present invention is that the step of applying pressure to the repair site via the first side and the second side of the composite structure includes applying pressure to the repair site using vacuum bags applied to the first side and the second side of the composite structure.

Yet another feature of the present invention is a method for performing a repair to an area including a damaged skin wherein an obstruction is in close proximity to the damaged area, which includes the steps of supporting the composite structure outboard of the damaged area and the obstruction which is in close proximity to the damaged area, removing the damaged skin from a first side of the composite structure and leaving a repair site with a skin faying surface on the first side of the composite structure, applying an adhesive to the skin faying surface, laying up a repair patch to the repair site and surrounding area of the repair site on the first side of the composite structure, placing a release film over the repair patch, positioning at least one heating blanket on a second side of the composite structure which is opposite to the first side of the composite structure, applying local vacuum bags to the repair site via the first side and the second side of the composite structure, insulating the area surrounding the repair site via the first side and the second side of the composite structure so as to reduce heat loss from the repair site, activating the at least one heating blanket so that heat is conducted through the composite structure from the second side to the entire repair site on the first side of the composite structure, activating the local vacuum bags so that pressure is applied to the second side of the composite structure and the entire repair site on the first side of the composite structure, and curing the repair patch.

Still another feature of the present invention is that it further includes the steps of removing the insulation from the first side of the composite structure and the second side of the composite structure, removing the local vacuum bags from the first side of the composite structure and the second side of the composite structure, removing the at least one heating blanket from the second side of the composite structure, and removing the release film from the repair patch.

Finally, still a further feature of the present invention is that the step of placing a release film over the repair patch includes placing a FEP film over the repair patch.

The novel features which are considered characteristic for the invention are set forth in particular in the appended claims. The invention itself, however, to its method of operation, together with additional objects and advantages thereof, will be best understood from the following description of the specific embodiment when read in connection with the accompanying drawing.

BRIEF DESCRIPTION OF THE DRAWING

The sole Figure is a cross sectional view of a composite structure utilizing the method for performing a repair on an obstructed section of a composite structure of the present invention.

DETAILED DESCRIPTION OF THE PREFERRED EMBODIMENT

Referring now to the sole Figure, the method for performing a repair on an obstructed section of a composite structure is shown generally at 10 curing a repair patch 12 to a damaged area 14 in close proximity to an obstruction 16 on a first side 18 of a composite structure 20. The obstruction 16 may be a stiffener, rib, hat section, a piece of hardware, or the like.

The damaged area 14 must first be cleaned out. This involves removing the damaged skin (not shown) from the damaged area 14 of the composite structure 20 and leaving a repair site 22 with a skin faying surface 24.

A layer of adhesive 26 is applied to the skin faying surface 24 and the surrounding area 28. The repair patch 12 is then laid up on the adhesive 26.

A release film 30 is placed over the repair patch 12. The release film 30 is preferably FEP film but is not limited to it.

At least one heating blanket 32 is positioned on a second side 34 of the composite structure 20. The second side 34 is opposite to the first side 18. Heat is conducted through the composite structure 20 from the second side 34 to the first side 18 and applied to the entire repair site 22.

A first local vacuum bag 36 is applied over the entire repair site 22 on the first side 18 including the obstruction 16 so that pressure is applied to the entire repair site 22. A second local vacuum bag 38 is applied over the entire heating blanket 32 on the second side 34 so that pressure is applied and the heating blanket 32 is held in intimate contact with the second side 34 of the composite structure 20. This ensures adequate thermal coupling between the heating blanket 32 and the composite structure 20.

A first breather patch 40 is placed intermediate the release film 30 and the first local vacuum bag 36. A second breather patch 42 is placed intermediate the heating blanket 32 and the second local vacuum bag 38. The first breather patch 40 and the second breather patch 42 more evenly distribute the pressure created by the first local vacuum bag 36 and the second local vacuum bag 38, respectively.

The area surrounding the repair site 22 is covered with insulation 44 to reduce heat loss from the repair site 22 during curing of the repair patch 12. The insulation 44 is placed over the first local vacuum bag 36 and the second local vacuum bag 38 and the surrounding area, as shown in the Figure.

Since the heating blanket 32 is disposed on the second side 34 of the composite structure 20, that is, on the side opposite to the first side 18 which contains the obstruction 16, the heating blanket 32 will not be affected by the obstruction 16 and will therefore transfer sufficient heat to the repair patch 12 to provide a good repair.

Once the repair patch 12 has adequately cured or some time thereafter, depending on the decision of the operator, the insulation 44, the first local vacuum bag 36, the second local vacuum bag 38, the first breather 40, the second breather 42, the at least one heating blanket 32, and the release film 30 are all removed, leaving a good repair.

It will be understood that each of the elements described above, or two or more together, may also find a useful application in other types of methods differing from the type described above.

While the invention has been illustrated and described as embodied in a method for peforming a repair on an obstructed section of a composite structure, it is not intended to be limited to the details above, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. A method for performing a repair to a damaged area of a composite structure wherein an obstruction is in close proximity to the repair site, comprising the steps of:
 (a) laying up a first patch on the repair site on a first side of the composite structure;
 (b) applying heat to the repair site via a second side of the composite structure which is opposite to the first side of the composite structure so that heat is conducted through the composite structure from the second side of the composite structure to the repair site on the first side of the composite structure;
 (c) applying pressure to the repair site via the first side and the second side of the composite structure; and
 (d) curing the first patch.

2. A method for performing a repair as defined in claim 1; further comprising the steps of:
 (a) supporting the composite structure outboard of the damaged area and the obstruction which is in close proximity to the damaged area prior to said step of laying up a first patch on the repair site on the first side of the composite structure;
 (b) removing the damaged area from the composite structure and leaving a repair site on the first side of the composite structure subsequent to said step of supporting the composite structure outboard of the damaged area and the obstruction which is in close proximity to the damaged area;
 (c) placing a second patch over the first patch subsequent to said step of laying up a first patch on the repair site on the first side of the composite structure;

(d) applying insulaiion to the area surrounding the repair site so as to reduce heat loss subsequent to said step of placing a second patch over the first patch.

3. A method of performing a repair as defined in claim 2; further comprising the steps of:
(a) removing the pressure from the first side and the second side of the composite structure;
(b) removing the heat from the second side of the composite structure;
(c) removing the insulation from the area surrounding the repair site; and
(d) removing the second patch from the first patch.

4. A method for performing a repair as defined in claim 1, wherein said step of laying up a first patch on the repair site includes laying up a repair patch on the repair site.

5. A method for performing a repair as defined in claim 1, wherein said step of placing a second patch over the first patch includes placing a release film over the first patch.

6. A method for performing a repair as defined in claim 4, wherein said step of placing a release film over the first patch includes placing a FEP film over the first patch.

7. A method for performing a repair as defined in claim 1, wherein said step of applying heat to the repair site via the second side of the composite structure includes applying heat to the repair site using a heating blanket applied to the second side of the composite structure.

8. A method for performing a repair as defined in claim 1, wherein said step of applying pressure to the repair site via the first side and the second side of the composite structure includes applying pressure to the repair site using vacuum bags applied to the first side and the second side of the composite structure.

9. A method for performing a repair to an area including a damaged skin wherein an obstruction is in close proximity to the damaged area, comprising the steps of:
(a) supporting the composite structure outboard of the damaged area and the obstruction which is in close proximity to the damaged area;
(b) removing the the damaged skin from a first side of the composite structure and leaving a repair site with a skin faying surface on the first side of the composite structure;
(c) applying an adhesive to the skin faying surface;
(d) laying up a repair patch to the repair site and surrounding area of the repair site on the first side of the composite structure;
(e) placing a release film over the repair patch;
(f) positioning at least one heating blanket on a second sdde of the composite structure which is opposite to the first side of the composite structure;
(g) applying local vacuum bags to the repair site via the first side and the second side of the composite structure;
(h) insulating the area surrounding the repair site via the first side and the second side of the composite structure so as to reduce heat loss from the repair site;
(i) activating the at least one heating blanket so that heat is conducted through the composite structure from the second side of the composite structure to the entire repair site on the first side of the composite structure;
(j) activating the local vacuum bags so that pressure is applied to the second side of the composite structure and the entire repair site on the first side of the composite structure; and
(k) curing the repair patch.

10. A method for performing a repair to an area as defined in claim 8; further comprising the steps of:
(a) removing the insulation from the first side of the composite structure and the second side of the composite structure;
(b) removing the vacuum bags from the first side of the composite structure and the second side of the composite structure;
(c) removing the at least one heating blanket from the second side of the composite structure; and
(d) removing the release film from the repair patch.

11. A method for performing a repair to an area as defined in claim 9, wherein said step of placing a release film over the repair patch includes placing a FEP film over the repair patch.

* * * * *

UNITED STATES PATENT AND TRADEMARK OFFICE
CERTIFICATE OF CORRECTION

PATENT NO. : 4,793,879

DATED : December 27, 1988

INVENTOR(S) : CHARLES C. MIMBS

It is certified that error appears in the above-identified patent and that said Letters Patent is hereby corrected as shown below:

Col. 1, line 40, "wiich" should be --which--

Col. 5, line 3, which is claim 2, "insulaiion" should be -- insulation --

Col. 6, line 6, which is claim 9, "face;" should be deleted line 12, which is also claim 9, "sdde" should be -- side --

Signed and Sealed this

Twenty-fourth Day of July, 1990

Attest:

HARRY F. MANBECK, JR.

*Attesting Officer*  *Commissioner of Patents and Trademarks*